May 14, 1940.  C. M. EASON  2,200,597
PLANETARY TRANSMISSION MECHANISM
Filed July 9, 1937   4 Sheets-Sheet 1

Inventor:
Clarence M. Eason,
By: Brown, Jackson, Boettcher & Dienner
Attys.

Inventor:
Clarence M. Eason
By:
Brown, Jackson, Boettcher & Dienner
Attys.

Inventor:
Clarence M. Eason

Patented May 14, 1940

2,200,597

UNITED STATES PATENT OFFICE 2,200,597

PLANETARY TRANSMISSION MECHANISM

Clarence M. Eason, Waukesha, Wis., assignor to Industrial Clutch Company, Waukesha, Wis., a corporation of Wisconsin Application July 9, 1937, Serial No. 152,720

5 Claims. (Cl. 74—289)

The present invention relates to planetary transmission mechanisms for transmitting a variable speed drive from a driving to a driven shaft. My improved transmission mechanism has its principal field of utility in internal combustion engine driven locomotives and rail cars, and in other heavy duty internal combustion engine driven vehicles, but it will be understood that in its broader aspects my invention can also be employed in any power transmitting situation where a speed change relation is desired.

The preferred embodiment of my improved transmission mechanism comprises a rotatable housing within which are enclosed a clutch and a planetary gear set, the driven element of the clutch and the planet gears of the gear set being carried by the rotatable housing. The driving shaft enters one end of the housing and is connected with the driving member of the clutch and with the driving central gear of the planetary gear set. The driven shaft enters the other end of said housing and is connected with the driven central gear of the planetary gear set. The rotation of the housing is controlled by a brake band, which is operable to lock the housing against rotation when it is desired to transmit a drive at a reduced speed through the planetary gearing. When a direct drive is desired, the brake band is released and the clutch is engaged, whereupon the housing is clutched to the driving shaft and revolves therewith for transmitting a direct drive to the driven shaft. The weight of the entire rotatable unit including the housing, the clutch, and the planetary gear set is relatively large in a heavy duty construction of this type. The matter of establishing a satisfactory relation of supporting bearings for such a unit has heretofore presented difficulties, due principally to the necessity of having to provide for the operation of the clutch through one end of the assembly. Heretofore, either the driving shaft or the driven shaft, or both, have borne the major portion if not all of the weight of the unit, as well as any unbalanced centrifugal forces which might arise in the unit. Hence, the shafts have had large bending moments and shear stresses imposed thereon, and have had to be of relatively large size. Furthermore, the fact that the driving and driven shafts both terminate within the assembly, makes it difficult to obtain even the equivalent supporting strength of a through shaft. In consequence, such constructions have been inherently objectionable from the standpoint of desired strength, excessive shaft and bearing wear, and susceptibility to vibration.

It is one of the objects of the present invention to provide an improved mounting for the transmission unit which will sustain all of the weight of the unit and all unbalanced centrifugal force loads or other radial loads, independently of the driving and driven shafts. This is accomplished by providing both ends of the rotatable housing with end heads or end portions having trunnions projecting therefrom, such trunnions being mounted in stationary pillow block bearings or other main bearings carried by the supporting frame of the vehicle. The driving and driven shafts enter the housing through these trunnions and are full-floating in the housing. Hence, the shafts have no bending moments nor shear stresses imposed thereon, and are only subjected to the torsion stresses of the driving load.

The provision of end heads at both ends of the rotatable housing for securing the above described mounting of the unit, results in the clutch structure being enclosed within the housing, thereby necessitating the establishment of clutch operating communication through the housing.

Another object of the invention is to provide improved means for establishing clutch operating communication from the outer side to the inner side of the housing, i. e., from the outer side to the inner side of the adjacent end head.

The clutch operating forces are relatively large in heavy duty transmission units for Diesel locomotives and the like, compressed air being frequently employed for creating the necessary energy to engage the clutch elements. In this regard, another object of the invention is to provide improved clutch operating means in which all clutch operating forces are self-contained within the rotatable transmission unit so that none of these forces create any end thrust on the unit. Thus, the supporting bearings for the rotatable unit have no end thrust imposed thereon incident to the operation of engaging or releasing the clutch.

Another object of the invention is to provide improved ball-cam apparatus for operating the clutch.

Another object of the invention is to provide a planetary transmission mechanism characterized by an improved clutch of the cone type. One of the features of this improved clutch is the employment of rubber mounting devices in the mounting of the shiftable clutch element, whereby the shifting movement of said clutch element under load can be accommodated by flexure of the rubber. Another feature is the employment of removable cone segments for the working face of the shiftable clutch element, whereby these segments can be readily removed for refacing the same without dismantling the transmission mechanism.

Other objects and advantages of the invention will be apparent from the following detailed description of certain preferred embodiments thereof. In the accompanying drawings illustrating such embodiments:

Figure 1:
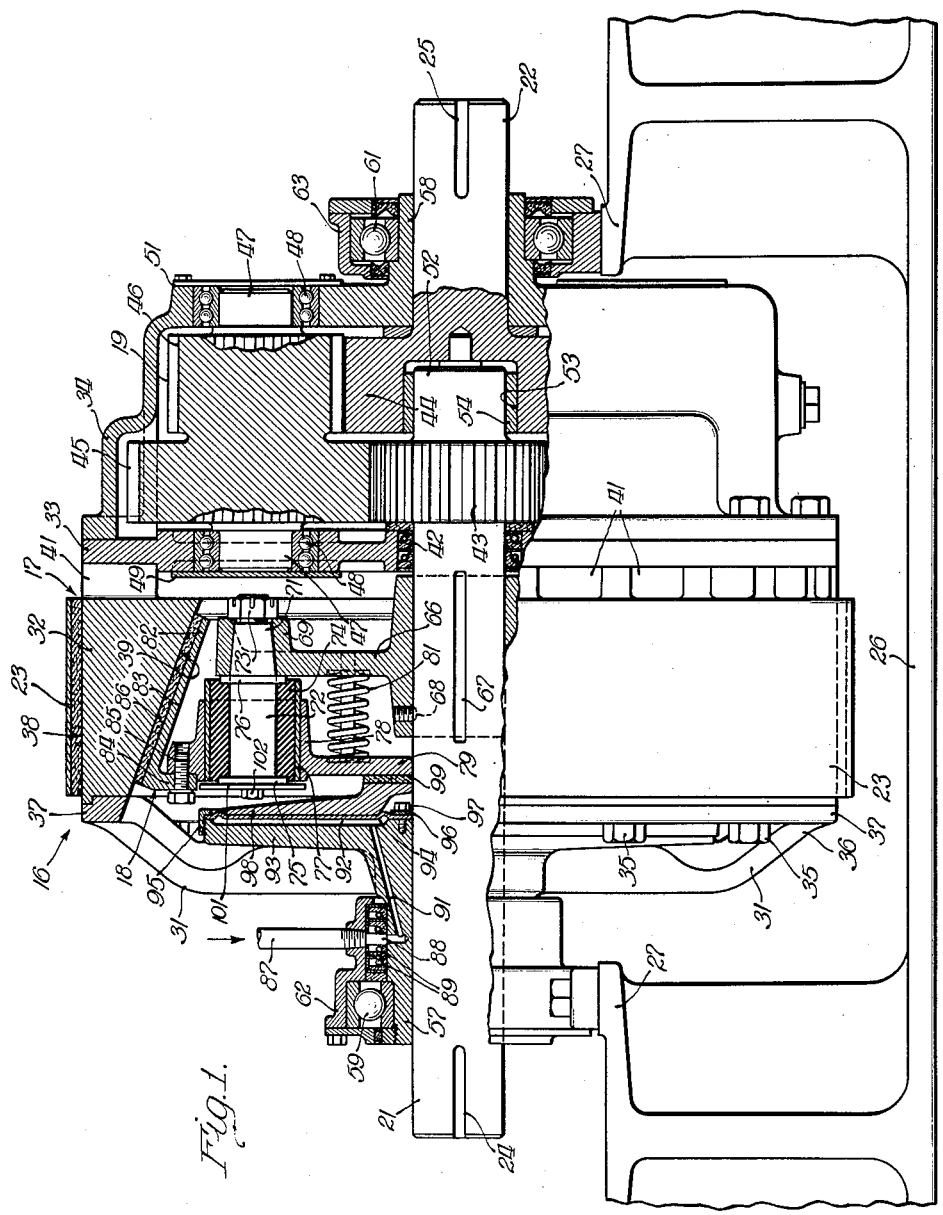
Figure 1 is an axial sectional view through one embodiment of the invention employing a compressed air diaphragm chamber mounted within the transmission unit for engaging the clutch.

Referring first to Figure 1, the planetary transmission unit is indicated in its entirety at 16, and comprises a rotatable housing 17 enclosing a clutch 18 at one end thereof and a planetary gear set 19 at the other end thereof. The driving shaft 21 enters the clutch end of the housing, and the driven shaft 22 enters the planetary gear end of the housing. A brake band 23 encircles the housing for controlling the rotation of the latter.

In internal combustion engine driven locomotives, and rail cars, there are usually two or possibly three of these transmission units 16 arranged in series. These units are substantially identical in all respects except that the speed reducing ratios of the planetary gear sets 19 may be different in the different units. The engine is connected to the driving shaft 21 of the first transmission unit, and the driven shaft of said first unit is coupled to the driving shaft of the second unit. The key slots 24, 25 in the outer ends of the driving and driven shaft 21 and 22 cooperate with any suitable types of coupling sleeves for establishing these coupled connections. The several transmission units are mounted on a main frame 26, from which rise bearing pedestals 27 on which are mounted the main bearings for the rotatable housing of each unit, as I shall presently describe. It will be evident that by the selective operation of the clutches 18 and brake bands 23 of the different units, the units may be made to selectively transmit either a direct drive or a speed reducing drive, thereby affording a wide variety of speed changes for the locomotive.

The housing 17 comprises an end head section 31, a brake drum section 32, a separating wall section 33, and an opposite end head section 34. These four sections are rigidly secured together by circumferentially spaced bolts 35 passing through the four sections. The end head 31 may be a solid plate, if desired, although for the purpose of circulating air through the clutch compartment of the housing and for facilitating removal of the clutch segments, I preferably construct the outer portion of said end head in the form of spider arms 36 which terminate in a bolting rim 37 through which the bolts 35 pass.

The brake drum section 32 of the housing has a cylindrical outer brake surface 38 for cooperating with the brake band 23. The housing section 32 is also formed with an inner conical surface 39 which functions as the driven element of the cone clutch 18. A plurality of circumferentially spaced slots 41 are provided in the end surface of the housing section 32, these slots having an impeller action during the rotation of the housing for causing a circulation of air through the clutch compartment. The separating wall section 33 separates the clutch compartment from the gear compartment so that lubricant in the latter compartment will not have access to the clutch surfaces. Any desired sealing or packing means 42 is interposed between the inner portion of the separating wall 33 and the drive shaft 21 for maintaining an oil tight joint at this point.

The planetary gear set 19 enclosed within the housing section 34 comprises a driving central gear 43 mounted on the driving shaft 21, and a driven central gear 44 mounted on the driven shaft 22. Meshing with these central gears at two or three angularly spaced points in the housing are pairs of planet gears 45—46. Stub trunnions 47 projecting from the ends of these planet gears have mounting in ball bearings 48 which are supported in the separating wall section 33 and the end section 34 of the housing. Cover plates 49 and 51 close the outer ends of the bearing openings in these housing sections for retaining the bearings in place and preventing the leakage of lubricant. The gears 43—46 may be proportioned for obtaining any desired speed reduction. The inner end of the driving shaft 21 is provided with a pilot extension 52 engaging in a pilot opening 53 at the inner end of the driven shaft 22. A bearing sleeve or a needle bearing 54 may be interposed between said pilot extension and pilot opening.

Referring now to the bearing mounting of the rotatable transmission unit 16, it will be seen that the end section 31 of the housing is provided with an outwardly extending sleeve trunnion 57, and that the other end section 34 is provided with an outwardly extending sleeve trunnion 58. These trunnions are supported within the inner races of two anti-friction main bearings 59 and 61 disposed at opposite ends of the housing. The outer races of said bearings are confined within pillow block bearing mounts 62 and 63 which are bolted to the bearing pedestals 27 of the supporting frame 26. There is no end thrust inherent in the operation of the mechanism, but a substantial inertia thrust will arise in the stopping and starting of the vehicle, particularly in the coupling or shifting of cars. I preferably have one of the main bearings sustain the thrust in both directions, the bearing 59 being shown as mounted for such duty. The other main bearing 61 is capable of shifting movement in each direction in the pillow block 63 for accommodating thermal expansion and contraction. It will be seen that the driving and driven shafts 21 and 22 both have full-floating mounting within the transmission unit, since neither shaft is subjected to any bending moments or shearing stresses by the weight of the unit.

Referring now to the clutch structure, the driving shaft 21 has a driving spider or ring 66 mounted thereon, the hub of said ring being secured to the shaft by the keys 67 and set screws 68. Tubular bosses 69 formed at a plurality of points on this torque transmitting ring 66 have tapered openings therein for receiving the tapered end portions 71 of driving studs 72. Nuts 75

73 screw over reduced threaded ends of the studs 72 and rigidly clamp the studs in the bosses 69. Engaging over the forward ends of the studs 72 are bushings 74 composed of rubber or other deformable and preferably resilient material, these bushings being compressed on the studs between the end flange 75 and the ring or collar 76. Surrounding the rubber bushings 74 are metallic sleeves 77 which are firmly secured to the outer surfaces of the bushings by vulcanization or by inherent pressure within the rubber. The metallic sleeves 77 each have a smooth sliding fit within a tubular boss 78 projecting inwardly from a disc member 79 which constitutes the web portion of the driving clutch element. Compression springs 81 are confined between the web portion 79 and supporting member 66 at angularly spaced points, the ends of these springs being seated in pockets in said web portion and said supporting member. These springs tend to shift the driving clutch element 82 to disengaged position. Said driving clutch element comprises a plurality of arcuate cone segments 83, each of which has an inwardly extending flange 84 at its large end adapted to be secured to the web portion 79 by the screws 85. The segments have facings of friction material 86 secured thereto.

In this embodiment of my invention I have shown the clutch operating communication as being established from the outer side of the end head 31 to the inner side thereof through the medium of compressed air. The air is conducted to the unit through a pipe 87 which screws into the bearing support 62 and has a reduced extension 88 extending into proximity to the trunnion sleeve 57. A plurality of spring pressed cup leather packing devices 89 confined between the bearing support 62 and trunnion sleeve 57 on each side of the pipe extension 88 prevents leakage of the compressed air at this rotating joint. Ducts 91 cored or drilled in the bearing trunnion 57 conduct the compressed air from said pipe extension to a diaphragm chamber 92 constituting a part of the end head 31. Such diaphragm chamber comprises an outer plate portion 93 formed integral with the end head 31. Constituting the inner wall of the chamber 92 is a flexible diaphragm 94 which has its outer edge secured to the chamber wall 93 by a clamping ring 95 screwing over said wall, and which has its inner edge secured to said wall by a ring 96 which is fastened to the wall by the screws 97. The diaphragm is reinforced by a pressure head 98 which is non-rotatably secured to the diaphragm, the inward thrusting pressure applied to said head being transmitted to the web portion 79 of the driving clutch element through an interposed thrust ring 99. An antifriction thrust bearing might be substituted for the thrust ring 99, if desired. The spring actuated outward shifting motion of the driving clutch element 82 is limited by a stop disc 101 secured to the outer end of each mounting stud 72 by a screw 102. The outer edge of this disc lies in the path of the tubular boss 78, so that after the clutch surfaces have become disengaged, further shifting movement of the driving clutch element is interrupted by the engagement of said boss against the stop disc. The parts are so related that at this time no appreciable pressure is being transmitted to the thrust ring 99. Hence, the only time that the thrust ring 99 is subjected to relative rotation between the members 79 and 98 under thrust load is during the short interval while the clutch is being engaged and the rotatable housing 17 is being brought up to the speed of the driving shaft 21. When the housing rotates at the same speed as the driving shaft, no relative rotation occurs between the members 79 and 98.

The cone segments 83 of the driving clutch element can be readily removed for refacing with new friction material 86 without requiring disassembly of any part of the transmission unit. With the clutch disengaged, the screws 85 are released, and the cone segments can then be slid endwise out along the conical driven surface 39, the spacing between the spider arms 36 of the end head 31 being ample to permit the removal of the cone segments through the spider openings. If it should be desired to make the end head 31 solid for closing this end of the clutch compartment, a single opening in said end head closed by a reasonable closure plate would suffice for removing the clutch segments 83.

Inward and outward shifting motion of the driving clutch element 82 through that range of movement where the clutch surfaces are not transmitting torque is accommodated by the metal to metal sliding movement of the tubular bosses 78 over the metallic sleeves 77 surrounding the rubber bushings 74. However, as soon as the clutch surfaces begin to transmit torque load in the operation of engaging the clutch, a heavy frictional force necessarily arises in the metal to metal contact between the bosses 78 and sleeves 77. Thereafter, the final shifting movement into complete clutch engaging relation is accommodated by the flexure of the rubber bushings 74. Hence, there is no binding action tending to restrict shifting movement of the clutch element at this time, and, therefore, there is no chattering or grabbing action of the clutch. The rubber bushings 74 also accommodate any slight angular misalignment that might exist between the driving and driven elements of the clutch.

Any desired operating mechanism may be employed for contracting the brake band 23, such operating mechanism usually deriving its operating energy from a compressed air cylinder in large, heavy duty installations.

In the operation of the transmission mechanism, the contracting of said brake drum locks the housing 17 against rotation and causes a slow speed drive to be transmitted from the driving shaft 21 to the driven shaft 22 through the planetary gearing 43—46. For establishing a direct drive between said shafts, the brake band 23 is released and compressed air is admitted to the diaphragm chamber 92 for engaging the clutch 18. This causes the housing 17 to rotate directly with the driving shaft 21, and such motion is transmitted directly to the driven shaft 22 through the planetary gears 46 and 44. It will be noted that when compressed air is acting in the diaphragm chamber 92 for holding the clutch engaged, the reaction pressure effective against the outer chamber wall 93 is transmitted to the rotatable housing structure through the end head 31. Thus, all forces arising in the operation of engaging and releasing the clutch are self-contained within the transmission unit so that the actuation of the clutch does not impose thrusting forces endwise on the unit.

Figure 2:
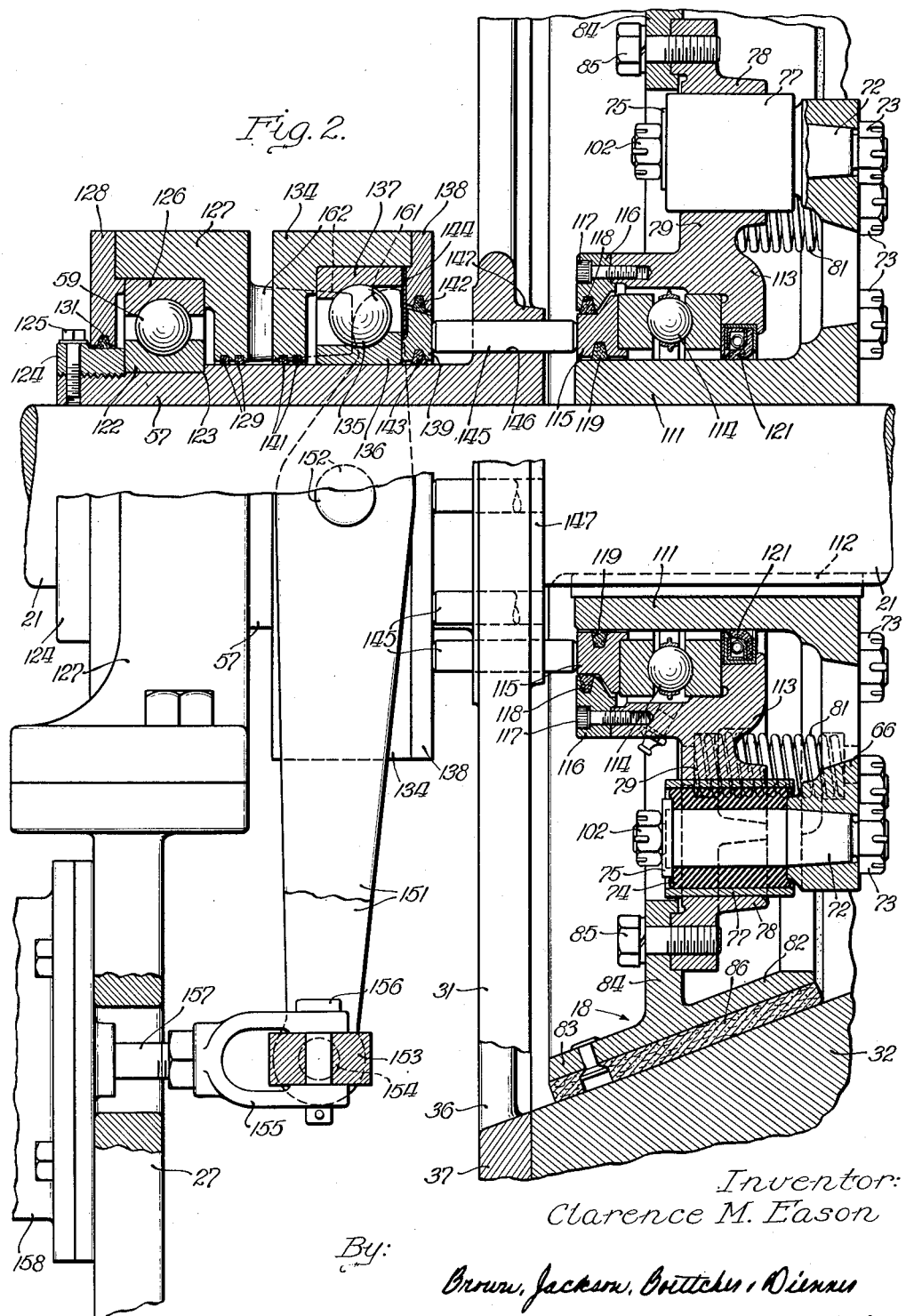
Figure 2 is a fragmentary sectional view of another embodiment employing lever apparatus for releasing the clutch.
Figure 3:
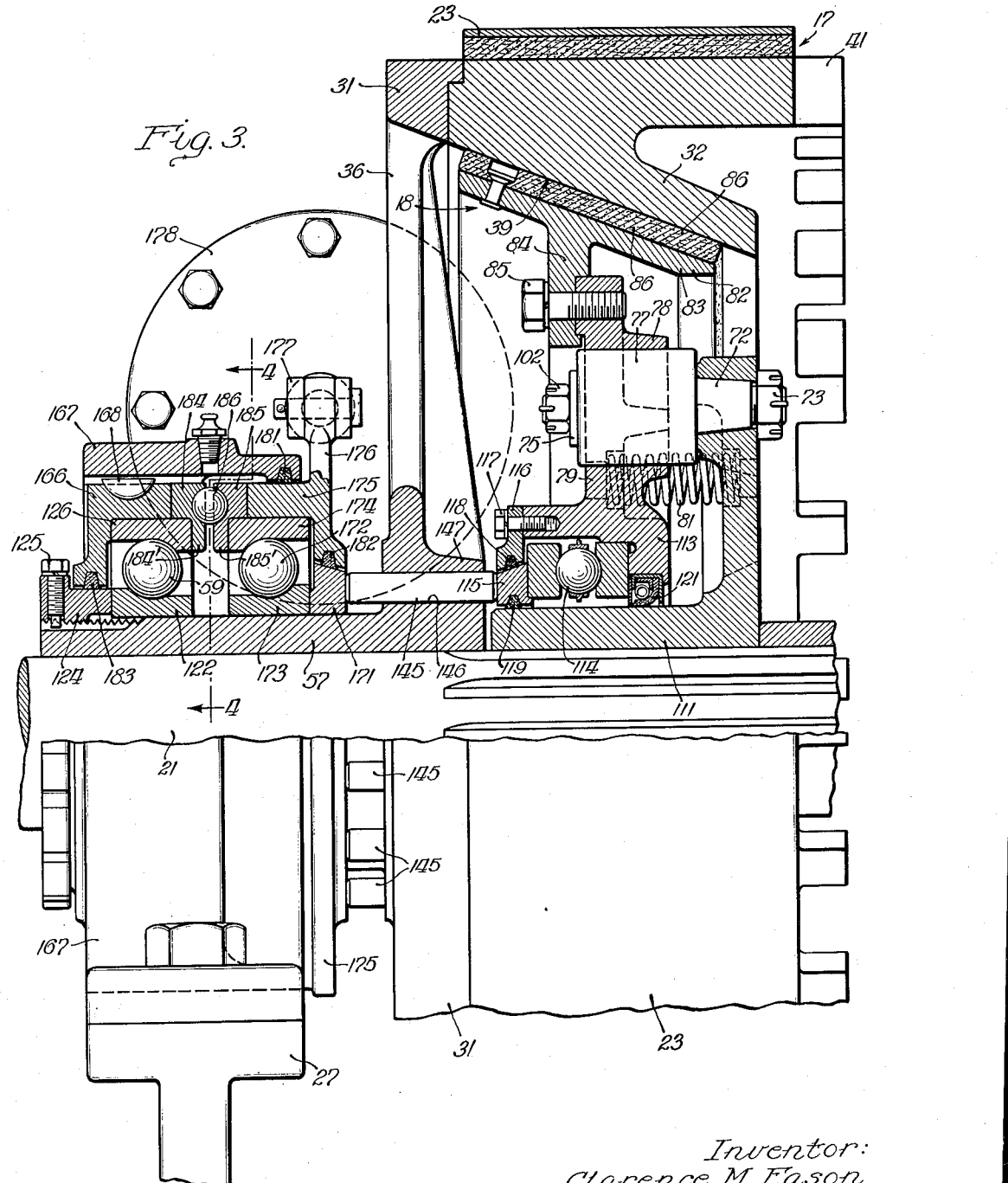
Figure 3 is a similar view of another embodiment employing ball-cam apparatus for releasing the clutch.
Figure 4:
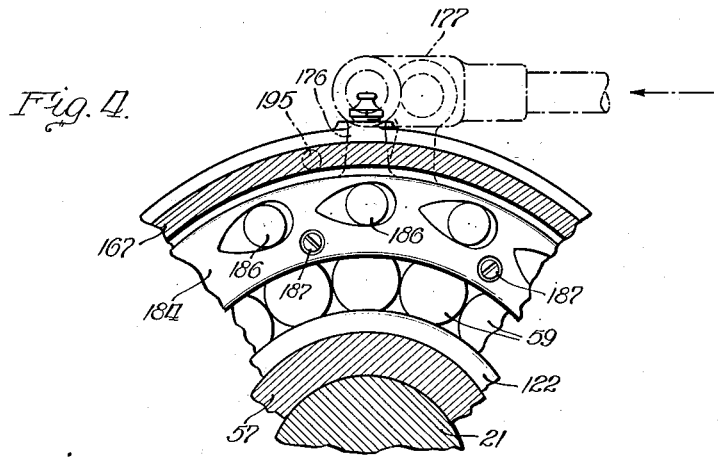
Figure 4 is a fragmentary transverse sectional view of the ball-cam apparatus, taken on the plane of the line 4—4 of Figure 3.

In Figure 2 I have illustrated a modified construction of clutch operating mechanism, the other portions of the transmission unit remaining the same as in the above-described embodiment. In this modified construction, the member 66 which supports the driving clutch element is provided with a relatively long hub 111 which is secured to the driving shaft 21 by the keys or splines 112. The web portion 79 of the driving clutch element 82 is formed with a cup shaped central hub portion 113 in which is confined an anti-friction thrust bearing 114. A thrust ring 115 abuts the outer race of the thrust bearing 114. A retaining cap 116 is secured to the end of the boss 113 by screws 117, and serves to retain the thrust ring and thrust bearing against outward displacement. Lubricant contained within the boss 113 is sealed against leakage therefrom by a sealing ring 118 in the cap 116 and bearing against the thrust ring 115; by a similar sealing ring 119 confined within the thrust ring 115 and bearing against the hub 111; and by a spring pressed packing ring 121 mounted in the boss 113 at the other end of the thrust bearing and pressed against the hub 111.

The end head 31 of the rotatable housing 17 is provided with an outwardly extending bearing trunnion 57 which is supported in the inner race of the main bearing 59, substantially as previously described. In this construction, the inner race 122 of the bearing 59 is clamped against a shoulder 123 on the trunnion sleeve 57 by a locking ring 124 which screws over a thread on the end of the trunnion sleeve and which is held in place thereon by a set screw or bolt 125. The outer race 126 of the main bearing 59 is confined within a bearing support 127 by an end cap 128 which is secured to the support 127 by cap screws or the like. Leakage of lubricant from around the bearing 59 is prevented by felt sealing rings 129 disposed in grooves in the bearing support 127 and engaging against the driving shaft 21, and by a felt sealing ring 131 confined within a groove in the end cap 128 and bearing against the locking ring 124. The bearing support 127 is bolted to the bearing pedestal 27 which rises from the bed frame 26, substantially as described of the preceding embodiment.

Interposed between the bearing support 127 and the end head 31 is a shifter member 134. The latter is in the form of an annular cage or carrier within which is confined an anti-friction thrust bearing 135 comprising inner and outer races 136 and 137. An end cap 138 secured to the shifter member 134 by cap screws retains the thrust bearing in the shifter member Abutting the inner bearing race 136 is a thrust ring 139. Sealing rings 141, 142, and 143 provided in the shifter member 134, in the end cap 138, and in the thrust ring 139 minimize the leakage of lubricant from around the thrust bearing 135. In addition, a thin metallic oil shield 144 is clamped between the outer bearing race 137 and the end head 138, this shield extending inwardly along the inner side of the thrust ring 139 and contacting the inner bearing race 136 to minimize the leakage of oil around the thrust ring. Clutch operating communication is established between the thrust ring 139 located on the outer side of the end head 31 and the thrust ring 115 located on the inner side of said end head through the medium of a plurality of push pins 145. These push pins are slidably mounted in a plurality of angularly spaced holes 146 provided in a boss 147 formed integral with the end head 31.

The shifting motion which actuates the push pins 145 is imparted to the shifter member 134 through the instrumentality of a pair of parallel levers 151 which are disposed on opposite sides of the shifter member. These levers are pivotally mounted on trunnion pins 152 which project outwardly from opposite sides of the shifter member 134. A cross bar 153 extends between the lower ends of the levers 151 and has cylindrical pivot extremities 154 which are pivotally mounted in the lever arms. A clevis 155 is pivotally mounted at the center of the cross bar 153 on a vertical pivot pin 156, and the outer end of said clevis is connected through a rod 157 extending to an air cylinder 158, which is shown as being bolted to the web portion of the bearing pedestal 27. The energization of said air cylinder thrusts the lower ends of the levers 151 in an inward direction toward the transmission unit. The fulcrum or reaction points for the levers are established at the upper ends thereof above the trunnion pins 152, these upper ends of the levers having rounded extremities 161 which are adapted to abut against lugs 162 projecting forwardly from the main bearing support 127 on opposite sides of the shifter member 134. Thus, it will be seen that the reaction pressure of engaging the clutch is transmitted through the bearing support 127 and main bearing 59 to the trunnion sleeve 57. Hence, all clutch operating forces are self-contained within the transmission unit and do not tend to create any end thrust tending to shift the unit. As described in connection with the preceding embodiment, the shiftable clutch element of this modified construction is also mounted on the supporting member 66 through the medium of the studs 72 and rubber bushings 74; and the arcuate cone segments 83 of said clutch element are also removable through the spaces between the spider arms of the end head 31. Furthermore, the weight and all radial loads of the revolving unit are transmitted through the trunnion sleeves 57 and 58 to the main bearings 59 and 61, so that the driving and driven shafts are both full-floating within the transmission unit.

In Figures 3 to 6 I have illustrated another modified construction of clutch operating mechanism including a ball-cam arrangement for imparting thrusting motion to the push pins 145. This modified construction has the same arrangement of thrust bearing 114 and thrust ring 115 for receiving thrusting pressure from the push pins 145, as previously described in connection with Figure 2. Similarly, the inner race 122 of the main bearing 59 abuts a retaining ring 124 which threads over the outer end of the trunnion sleeve 57 and is retained thereon by a set screw 125. The outer race 126 of the main bearing is mounted in a carrier 166 which has a sliding fit within a pillow block type of bearing support 167. A key 168 mounted in the carrier 166 and engaging a longitudinal keyway in the bearing support holds the carrier 166 against rotation. The pillow block bearing support 167 is bolted to the bearing pedestal 27 extending upwardly from the bed frame 26. In this modified embodiment, the main bearing 61 at the opposite end of the transmission unit is arranged to sustain the inertia thrust of the unit in both directions. The outer ends of the push pins 145 abut a thrust ring 171 which in turn abuts the inner race 173 of a thrust bearing 172 which is also enclosed within the bearing support 167. This thrust bearing 172 preferably carries no part of the radial load of the transmission unit. Surrounding the outer race 174 of said bearing is an operating sleeve or hub 175 from which extends an operating arm 176. Pivotally attached to the outer end of said arm is a link connection 177 which extends to a laterally disposed air cylinder 178 for actuating the clutch, the energization of said cylinder causing the sleeve member 175 to be oscillated. Sealing rings 181, 182, and 183 are provided in the bearing support 167, in the operating member 175 and in the bearing carrier 166, respectively, for retaining lubricant within the bearing assembly.

The ball-cam apparatus for imparting thrust to the thrust bearing 172 comprises two cam rings 184 and 185 between which are disposed a series of circumferentially spaced balls 186. The ring 184 has an inwardly extending flange 184' for transmitting thrust to the outer race 126 of the main bearing 59, and the ring 185 has a similar flange 185' for transmitting thrust to the outer race 174 of the thrust bearing 172. The cam ring 184 is secured to the bearing carrier 166 either by the screws 187 (Figure 5) or by a suitable arrangement of keys, whereby said ring is stationarily held against rotation. The other cam ring 185 is similarly secured either by screws 188 or by a suitable arrangement of keys to the operating sleeve 175, whereby said latter cam ring is compelled to turn with the oscillatory movement of said operating sleeve.

Figure 5:
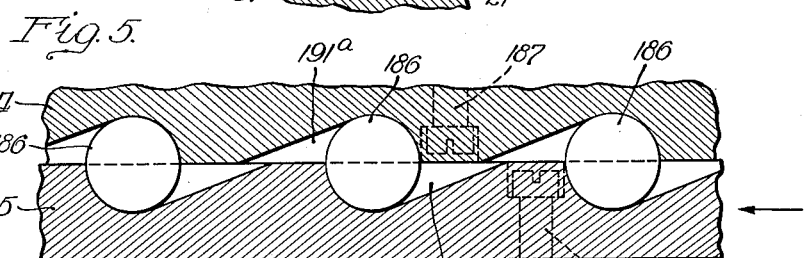
Figures 5 and 6 are sectional developments showing different positions of the ball-cam apparatus.
Figure 6:
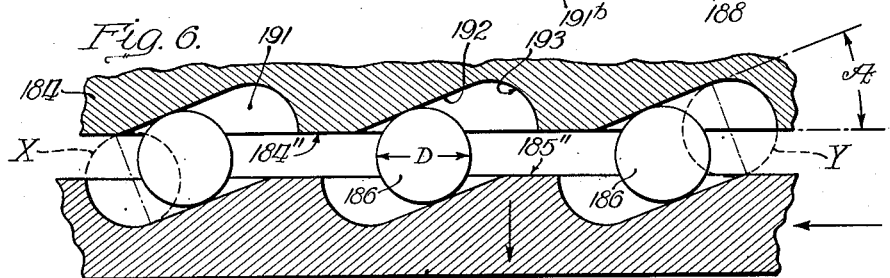
Figure 7:
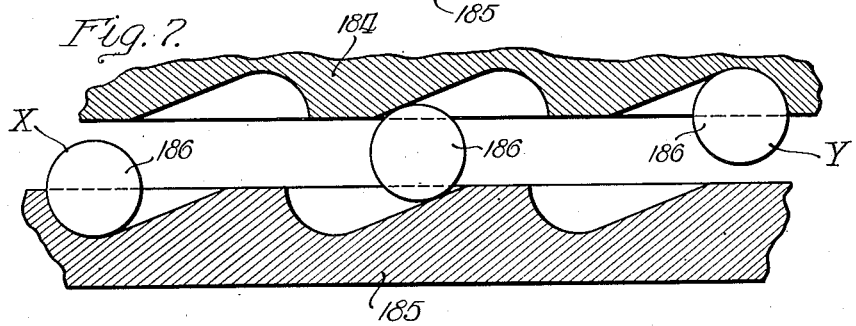
Figure 7 is a similar view showing an abnormal condition of the ball-cam apparatus.

Figures 5, 6, and 7 are developed sections of the two cam rings 184 and 185, and it will be seen from these sections that the opposing surfaces of said rings are provided with complemental half-pockets 191a and 191b, respectively, which are preferably duplicates and are arranged in oppositely extending paired relation to form a complete pocket 191, each of such complete pockets having an individual ball 186 confined therein. These pockets are of spherical cross section, and the bottom surfaces 192 thereof form parallel inclined planes or cam surfaces on which the balls 186 have rolling contact. The shallow end of each half-pocket extends directly to the outer flat surface 184'' or 185'' of its respective cam ring, and the deep end thereof terminates in a spherically shaped abutment surface 193. In the preferred construction of the apparatus, the deep ends of the half-pockets are made substantially equal in depth to one-half the diameter of each of the balls 186, thereby affording the maximum range of separating movement between the cam rings for a given diameter of ball. Hence, when the ball-cam apparatus is in the closed or contracted relation illustrated in Figure 5, the adjacent surfaces of the two cam rings are in contact or approximate contact with each other, and the semi-spherical end abutments 193 are substantially in contact with the opposite surfaces of the balls. The contact between the adjacent surfaces of the cam rings, or the contact of the end abutments with the balls, may be utilized as the limiting stop for limiting the oscillation of the cam ring 185 in its clutch releasing direction of throw. The pressure of the clutch springs acting through the push pins 145 is effective to return the ball cam apparatus to the normal position illustrated in Figure 5, although a supplementary spring may also be associated with the link connection 177 or with the piston in the air cylinder 178 for assisting in effecting this return oscillation of the cam ring 185. It will be understood that when the air cylinder is energized to engage the clutch, the oscillatable cam ring 185 is moved in the direction indicated by the arrow in Figure 6, thereby causing the rolling motion of the balls 186 on the parallel inclined surfaces of the complemental half-pockets to impart an axial shifting movement to said movable cam ring 185. This axial shifting movement is transmitted through the thrust bearing 172 and thrust ring 171 to the push pins 145 for engaging the clutch.

Each ball 186 is independently movable in its pair of complemental half-pockets 191a and 191b. Hence, if any wear, inaccuracy of the parts, or accumulation of dirt should tend to prevent free rolling motion of one of the balls in the rotary motion of the movable cam ring 185, such failure of this one ball to roll freely cannot impede free rolling motion of the other balls.

Thus, although most of the balls will have a rolling motion proportionate to the relative linear travel between the complementary half-pockets in the operation of engaging the clutch, nevertheless it is possible for any one of the balls to remain in the deep end of its half-pocket 191b, as indicated at X in Figure 6, or to remain in the deep end of its half-pocket 191a, as indicated at Y, or to assume any intermediate position. In this regard, it is desirable that all of the balls carry their proportionate share of the total thrust load, irrespective of their positions in the pockets; also, that they be prevented from getting out of their respective pockets or getting into positions where they might obstruct the return motion of the movable cam ring 185 back to clutch releasing position. Such is accomplished by limiting the axial shifting movement of the cam ring 185 to a maximum distance which bears a predetermined relation to the diameter of the balls. In the preferred construction shown, wherein the opposing surfaces of the two cam rings abut when the ball-cam device is in its clutch releasing position, the maximum separating distance between the two cam rings should not exceed one-half the ball diameter D, and should preferably be slightly less than one-half the ball diameter, depending upon the angle A of the cam surface of the ball pockets. That is to say, by limiting the axial shifting motion of the cam ring 185 to a distance equal to half the ball diameter multiplied by the cosine of the angle A, each ball can occupy any point in the length of its complementary cam pockets and still transmit its proportionate share of thrust from the movable cam ring to the stationary cam ring. Figure 6 shows such maximum limit of shifting motion, and it will be observed that the balls in the dotted positions X and Y are still effective to transmit their proportionate share of the total thrust, as is evidenced by the fact that the diametrical thrust lines drawn through these balls at right angles to the inclined surfaces of the cam pockets intersect both cam surfaces. The axial shifting movement of the cam ring 185 can be confined to the above stated limits by limiting the rotative movement of said cam ring to a distance equal to half the ball diameter divided by the sine of the angle A, such distance being measured along an arc passing through the centers of the balls. Movement of the cam ring 185 beyond the aforementioned limits permits of the condition illustrated in Figure 7. It will be noted that the ball illustrated in the center of this figure is sustaining thrust, but that the balls X and Y to either side thereof are not sustaining any of the thrust. When such a condition is possible, there is no assurance that any of the balls will continue to sustain thrust throughout the entire motion of engaging the clutch. Obviously, further separating movement between the cam rings would permit the balls to escape from their respective pockets and to become interposed between the adjacent flat surfaces of the rings so as to prevent the release of the clutch.

The aforementioned limit of motion is preferably secured by limiting the rotative movement of the cam ring 185, such being shown as accomplished through the provision of a stop pin 195 (Figure 4) projecting forwardly from the pillow block bearing support 167 in position to be engaged by the operating arm 176. Ordinarily, complete engagement of the clutch will be effected before the arm 176 strikes the stop pin 195, but continued wear of the friction lining of the clutch will permit further movement of said operating arm, and the provision of the stop pin 195 positively prevents the possibility of the rotatable cam ring 185 being actuated beyond the aforementioned limits. The dash and dot line position of the lever 176 in Figure 4 corresponds to a clutch engaging or partly actuated position of the ball-cam apparatus, the dotted line position of said lever representing approximately the normal position thereof.

When the wear of the clutch lining 86 has progressed to the point that the arm 176 is engaging the stop pin 195 before the clutch is effectively engaged, a take-up adjustment can be made by releasing the set screw 125 and screwing the retaining ring 124 (Figure 3) inwardly along the threaded end of the trunnion sleeve 57. This shifts the entire ball-cam assembly, and also the bearing 59 and carrier 166, inwardly along said trunnion sleeve, thereby repositioning the ball-cam apparatus at a new location which compensates for the wear of the clutch lining. After the lining has been worn to the point that it is desirable to replace the same, the ball-cam apparatus is shifted back along the trunnion sleeve to its original location, so as to accommodate the greater thickness of the new lining.

Instead of having the rotary motion of the cam ring 185 limited by the engagement of the arm 176 against the stop pin 195, the travel of the piston in the air cylinder 178 may be arranged to limit such motion. When the clutch lining is new, only about one-half of the total piston travel or so will be effective to engage the clutch. The total piston travel will afford the stop limit above mentioned, but such total piston travel will probably not use up all the effective thickness of the clutch lining. Hence, the shiftable adjustment afforded through the retaining ring 124 enables the ball-cam apparatus to be repositioned for obtaining the maximum amount of service out of the lining.

While I have illustrated and described what I regard to be the preferred embodiments of my invention, nevertheless it will be understood that such are merely exemplary and that numerous modifications and rearrangements may be made therein without departing from the essence of the invention.

I claim:

1. In planetary transmission mechanism, the combination of a rotatable housing, brake means for controlling the rotation of said housing, driving and driven shafts entering said housing, planetary gearing within said housing, a clutch within said housing, push pins entering one end of said housing for actuating said clutch, a trunnion sleeve projecting from the latter end of said housing, a main bearing supporting said trunnion sleeve, and apparatus disposed between said main bearing and said push pins for transmitting motion to said push pins, said apparatus having its reaction pressure borne by said housing.

2. In planetary transmission mechanism, the combination of a rotatable housing, brake means for controlling the rotation of said housing, driving and driven shafts entering said housing, planetary gearing within said housing, a clutch within said housing, push pins entering one end of said housing for actuating said clutch, a main bearing for supporting said housing independently of said shafts, a shifter member disposed between said main bearing and said push pins for actuating said push pins, a lever for actuating said shifter member, and means for transmitting the reaction pressure of said lever to said housing.

3. In planetary transmission mechanism, the combination of a rotatable housing, brake means for controlling the rotation of said housing, driving and driven shafts entering said housing, planetary gearing within said housing, a clutch within said housing, push pins entering one end of said housing for actuating said clutch, a trunnion sleeve projecting from the latter end of said housing, a main bearing supporting said trunnion sleeve, a shifter member movable axially of said trunnion sleeve for imparting thrusting motion to said push pins, a lever for actuating said shifter member, and means for transmitting the reaction pressure of said lever to said main bearing.

4. In planetary transmission mechanism, the combination of a rotatable housing, brake means for controlling the rotation of said housing, driving and driven shafts entering said housing, planetary gearing within said housing, a clutch within said housing comprising a shiftable clutch element, and means for controlling said clutch including a stationary cam ring, a rotatable and shiftable cam ring operative to transmit shifting motion to said clutch element, a plurality of complemental half-pockets in the opposing faces of said rings, said half-pockets having inclined cam surfaces, a single ball in each pair of half-pockets, the balls in different pairs of half-pockets being independently movable, and means for limiting the shifting movement of said shiftable cam ring to a distance not exceeding half the diameter of the balls.

5. In planetary transmission mechanism, the combination of a rotatable housing, brake means for controlling the rotation of said housing, driving and driven shafts entering said housing, planetary gearing in one end of said housing, a female clutch cone in the other end of said housing and rotating therewith, a male clutch cone connected to one of said shafts and shiftable into engagement with said female cone, an end head secured to the latter end of said housing and enclosing both of said clutch cones, push pins passing through said end head for imparting shifting movement to said shiftable clutch cone, a trunnion sleeve projecting from said end head, an anti-friction main bearing supporting said trunnion sleeve, and clutch actuating means comprising an anti-friction thrust bearing mounted on said trunnion sleeve between said main bearing and said push pins and operative to transmit shifting force to said push pins and to transmit the reaction of said shifting force through said main anti-friction bearing to said trunnion sleeve.

CLARENCE M. EASON.